United States Patent [19]

Fujimoto et al.

[11] Patent Number: 4,848,303

[45] Date of Patent: Jul. 18, 1989

[54] METHOD OF CONTROLLING OPERATION OF INTERNAL COMBUSTION ENGINES

[75] Inventors: Sachito Fujimoto; Makoto Hashiguchi, both of Wako, Japan

[73] Assignee: Honda Giken Kogyo K.K., Tokyo, Japan

[21] Appl. No.: 174,847

[22] Filed: Mar. 29, 1988

[30] Foreign Application Priority Data

May 8, 1987 [JP] Japan .................................. 62-112976

[51] Int. Cl.$^4$ ............................................ F02M 25/06
[52] U.S. Cl. ..................................... 123/571; 123/486; 123/480; 74/860
[58] Field of Search ................ 123/478, 480, 486, 571; 74/860

[56] References Cited

U.S. PATENT DOCUMENTS

| | | | |
|---|---|---|---|
| 4,454,853 | 6/1984 | Hasegawa | 123/571 |
| 4,553,518 | 11/1985 | Takao et al. | 123/478 |
| 4,598,684 | 7/1986 | Kato et al. | 123/571 X |
| 4,640,257 | 2/1987 | Kodama et al. | 123/571 |
| 4,665,883 | 5/1987 | Amano et al. | 123/571 |

Primary Examiner—Willis R. Wolfe
Attorney, Agent, or Firm—Arthur L. Lessler

[57] ABSTRACT

A method of controlling an operation of an internal combustion engine. A memory has stored therein a plurality of basic values of a control amount by which the operation of the engine is to be controlled, and which conform to at least one operating parameter of the engine, as well as at least one correction value for correcting the basic values. When each of first and second conditions is detected under which the operation of the engine is required to be controlled by respective different amounts, ones of the basic values are read from the memory, which corresponds to the value of the at least one operating parameter. When a predetermined one of the first and second conditions is detected, the at least one correction value is read from the memory, by which the read basic values are corrected by the read correction value. The operation of the engine is controlled by control amounts based upon the corrected basic values. The operation of the engine includes control of fuel supply to the engine and exhaust gas recirculation control.

7 Claims, 6 Drawing Sheets

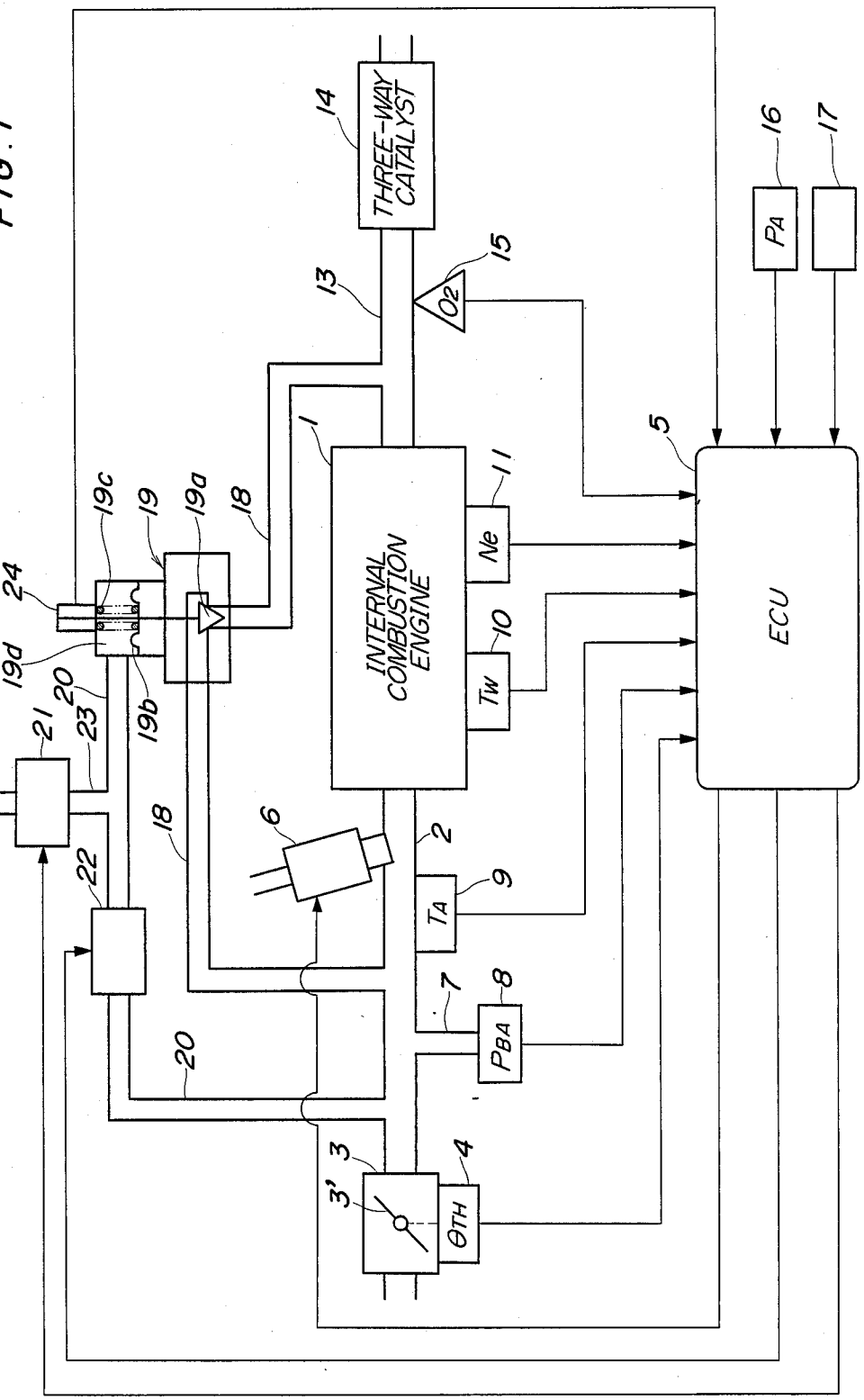

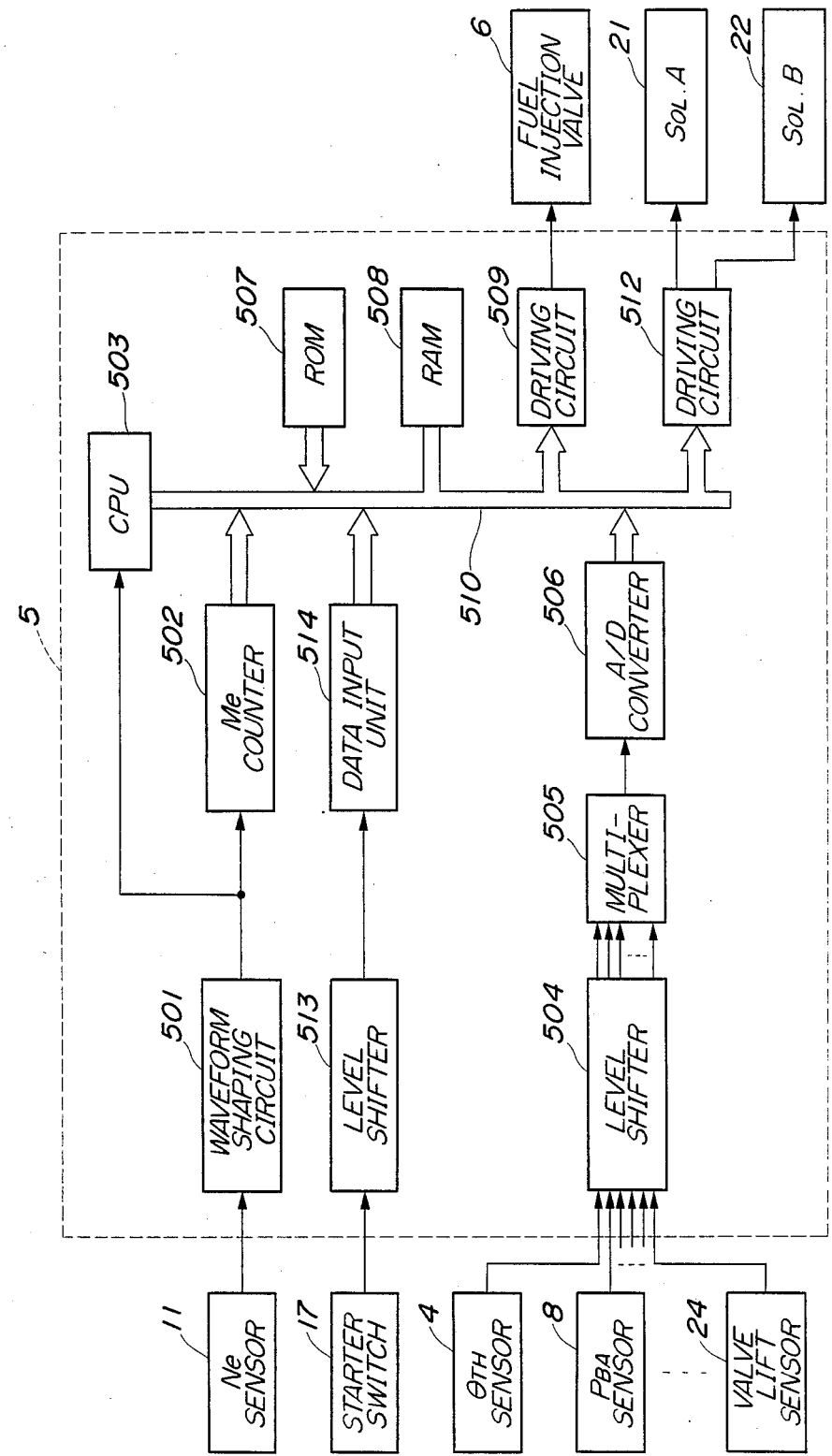

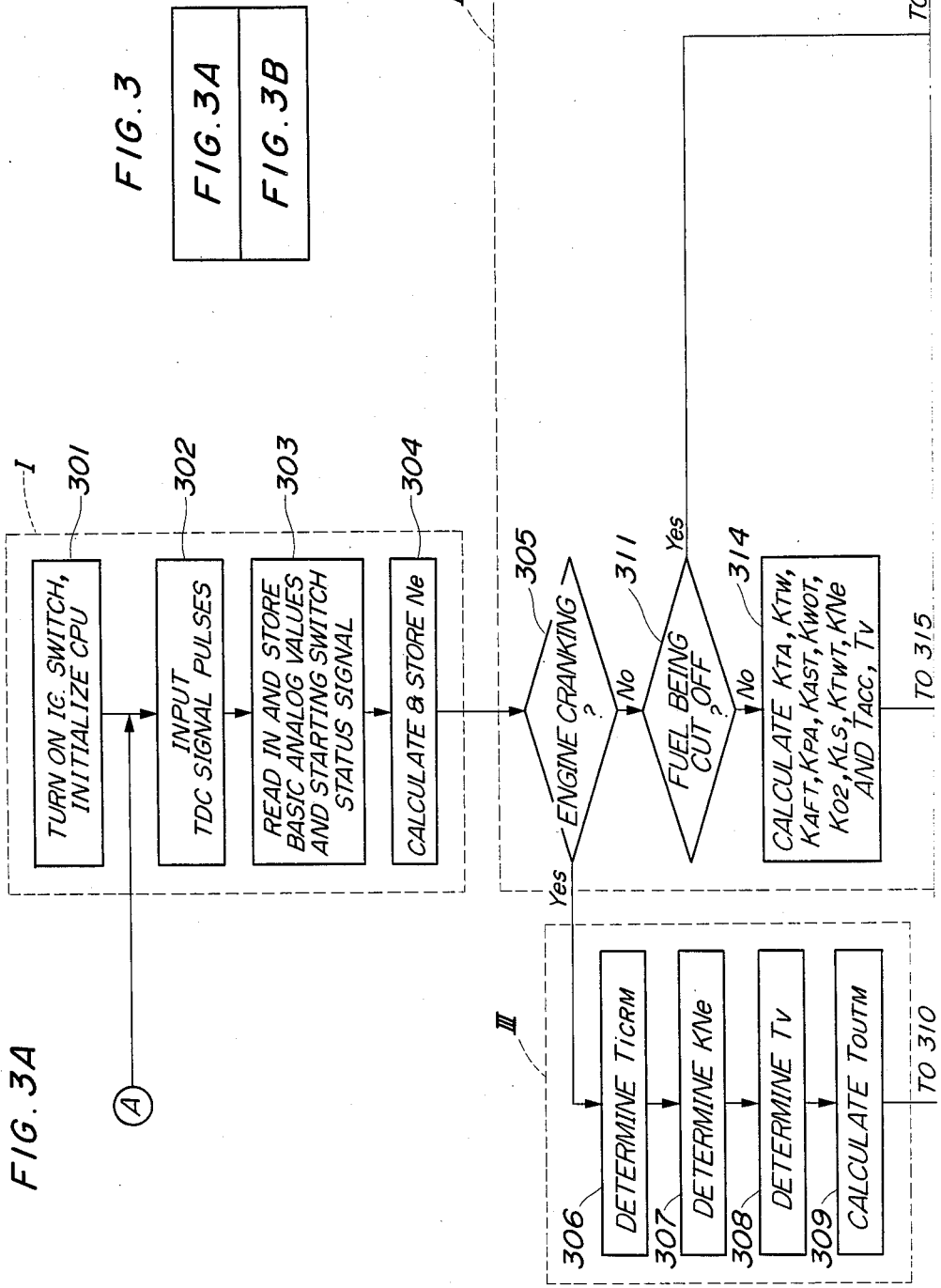

FIG.4

| PBA\Ne | PBA1 | PBA2 | ----- | PBAj | ----- | PBA17 |
|---|---|---|---|---|---|---|
| N1 | TiM1,1 | TiM1,2 | | | | |
| N2 | TiM2,1 | TiM2,2 | | | | |
| ⋮ | | | | | | |
| Ni | | | | TiMi,j | | |
| ⋮ | | | | | | |
| N18 | | | | | | TiM18,17 |

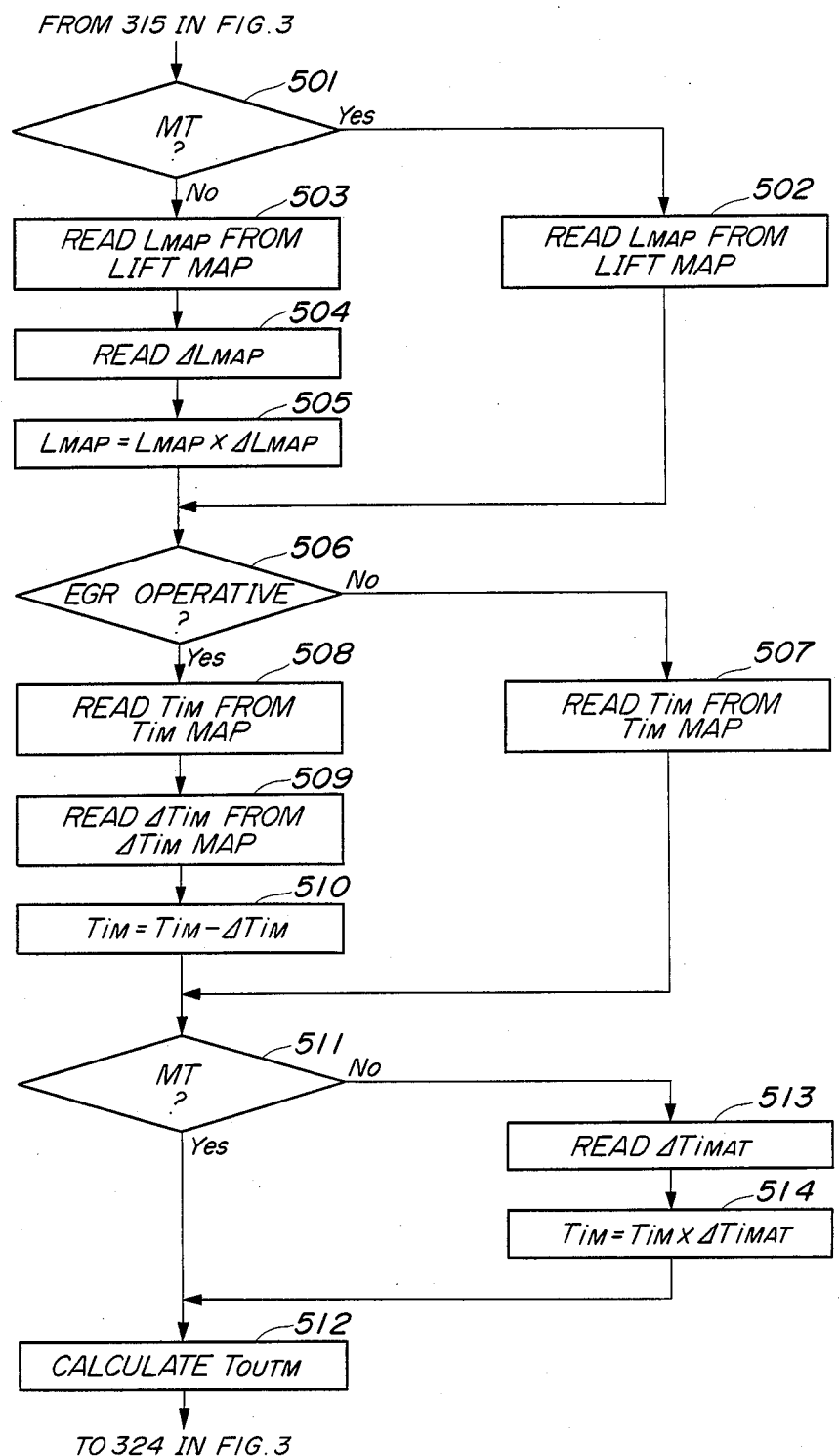

METHOD OF CONTROLLING OPERATION OF INTERNAL COMBUSTION ENGINES

BACKGROUND OF THE INVENTION

This invention relates to a method of controlling operation of an internal combustion engine, and more particularly, to a control method of this kind which is capable of suitably controlling the amount of fuel supplied to an internal combustion in dependence upon whether an exhaust gas recirculation control system associated with the engine is operating or not, etc.

A known method of controlling the supply of fuel to an internal combusion engine, such as disclosed by the assignee of the present application in Japanese Provisional Patent Publication (Kokai) No. 58-82037, includes storing in a memory basic fuel supply values conforming to a plurality of operating parameters of an internal combustion engine equipped with an exhaust gas recirculation control system, reading a value of the basic fuel supply values that corresponds to values of the operating parameters, correcting the read basic fuel supply value in dependence upon operating conditions of the engine, and controlling the amount of fuel supplied to the engine by using the corrected value.

With this conventional control method, two sets of map values of basic fuel supply values conforming to the plurality of operating parameters are provided, one for use when the exhaust gas recirculation control system is operating and one for use when it is not, and these sets of map values are stored in the memory. In order to store these two sets of map values, a read-only memory (hereinafter referred to as the "ROM") having a large storage capacity is needed. The additional memory capacity required results in a higher manufacturing cost. In particular, with the greater complexity of fuel supply control programs in recent years, there is a demand for larger memory capacity for the purpose of storing such programs. However, the aforementioned requirement for greater memory capacity needed to store the map values runs counter to this demand.

SUMMARY OF THE INVENTION

It is therefore the object of the invention to provide a method of controlling operation of an internal combustion engine so adapted as to enable a reduction in required ROM capacity while being capable of effecting optimum control of operating amounts such as the amount of fuel supplied to the engine, which control conforms to a plurality of operating parameters of the engine and to factors such as the operating state of an exhaust gas recirculation control system associated with the engine.

To attain the above object, the present invention provides a method of controlling an operation of an internal combustion engine, comprising:

(a) storing in memory means a plurality of basic values of a control amount by which the operation of the engine is to be controlled, and which conform to at least one operating parameter of the engine;

(b) storing in the memory means at least one correction value for correcting the basic values of the control amount;

(c) detecting first and second conditions under which the operation of the engine is required to be controlled by respective different amounts;

(d) when each of the first and second conditions is detected in the step (c), reading from the memory means ones of the basic values of the control amount, which correspond to values of the at least one operating parameter of the engine;

(e) when a predetermined one of the first and second conditions is detected in the step (c), reading from the memory means the at least one correction value, and correcting the basic values of the control amount read in the step (d) by the the at least correction value; and (f) controlling the operation of the engine by control amounts based upon the basic values of the control amount corrected in the step (f).

The above operation of the engine may be control of fuel supply to the engine wherein one of the first and second conditions is fulfilled when an exhaust gas recirculation control system of the engine is operative, and the other condition is fulfilled when the exhaust gas recirculation control system is inoperative. Further, it may be so arranged that one of the first and second conditions is fulfilled when the engine is installed in a vehicle equipped with a manual transmission, and the other condition is fulfilled when the engine is installed in a vehicle equipped with an automatic transmisssion.

The above operation of the engine may be exhaust gas recirculation control wherein one of the first and second conditions is fulfilled when the engine is installed in a vehicle equipped with a manual transmission, and the other condition is fulfilled when the engine is installed in a vehicle equipped with an automatic transmisssion.

Thus, the capacity of a ROM serving as the memory can be reduced to thereby enable use of a less expensive memory without sacrificing optimum control of the amount of fuel supplied to the engine in accordance with operating parameters of the engine and the operating state of the exhaust gas recirculation control system.

The above and other objects, features and advantages of the invention will be apparent from the following detailed description taken in conjunction with the accompanying drawings.

BRIEF DESCRIPTION OF THE DRAWINGS

FIG. 1 is a block diagram showing the overall construction of an embodiment of a fuel supply control system for an internal combustion engine to which the control method of the present invention is applied;

FIG. 2 is a circuit block diagram illustrating the internal construction of an electronic control unit shown in FIG. 1;

FIGS. 3, 3A and 3B are a flowchart of an embodiment of a control program for controlling fuel supply and exhaust gas recirculation;

FIG. 4 is a map of basic values TiM indicating the opening periods of fuel injection valves; and FIG. 5 is a flowchart of part of another embodiment of a control program for controlling fuel supply and exhaust gas recirculation.

DETAILED DESCRIPTION

Figure 3B:
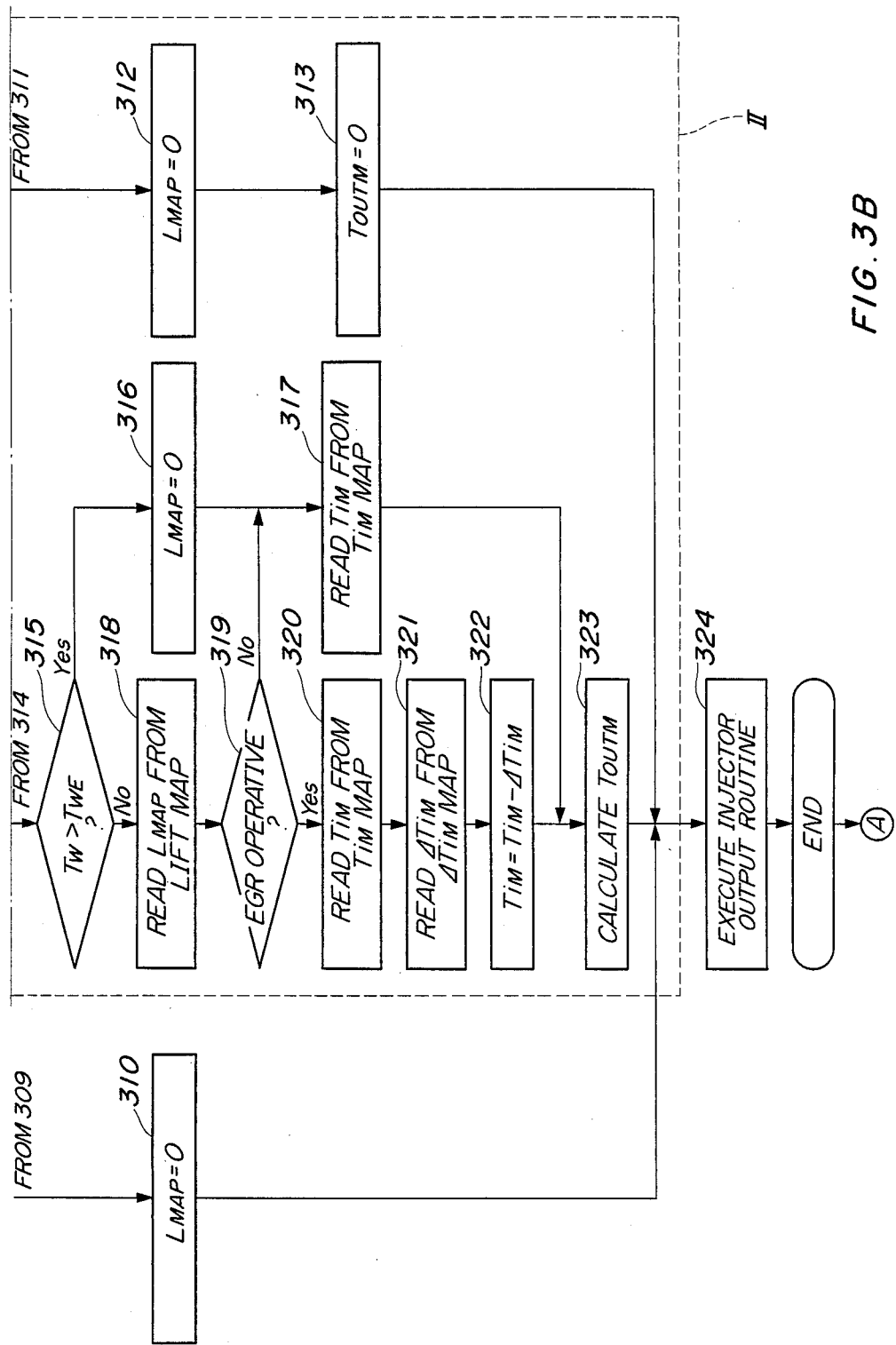

Preferred embodiments of a method in accordance with the invention will now be described with reference to the accompanying drawings.

FIG. 1 shows the overall construction of an internal combustion engine fuel supply control system to which the control method of the invention is applied. The engine, designated by reference numeral 1, is e.g. of the four-cylinder type and has an intake pipe 2 connected thereto. The intake pipe 2 is provided with a throttle body 3 housing a throttle valve 3' arranged in the intake pipe 2. A throttle valve opening ($\theta$TH) sensor 4 is connected to the throttle valve 3' for converting the sensed opening of the throttle valve 3' into an electric signal delivered from the sensor to an electronic control unit 5 (hereinafter referred to as the "ECU") 5.

A fuel injection valve 6 for each one of the engine cylinders is provided in the intake pipe 2 between the engine 1 and the throttle body 3 at a location slightly upstream of the intake valve (not shown) of each cylinder. Each fuel injection valve 6 is connected to a fuel pump, not shown, and is electrically connected to the ECU 5. The period of time during which each valve is opened to inject fuel is controlled by a signal from the ECU 5.

An absolute pressure (PBA) sensor 8 is connected to the intake pipe 2 via a pipe 7 at a location downstream of the throttle valve 3' of the throttle body 3. An electric signal indicative of absolute pressure in the intake pipe 2 downstream of the throttle valve 3' is produced by the absolute pressure sensor 8 and delivered to the ECU 5. An intake air temperature (TA) sensor 9 is arranged in the intake pipe at a location downstream of the absolute pressure sensor 8 and converts intake air temperature detected thereby into an electrical signal that is delivered to the ECU 5.

An engine coolant temperature (TW) sensor 10, which is constituted by a thermister or the like, is mounted in the cylinder block wall of the engine cylinder whose interior is filled with cooling water. The sensor 10 senses the coolant temperature and applies a signal indicative thereof to the ECU 5.

An engine rotational speed (Ne) sensor 11 is arranged in facing relation to the engine camshaft or crankshaft, neither of which is shown. The Ne sensor 11 outputs a top dead center (TDC) signal pulse at each of predetermined crank angle positions each time the crankshaft of the engine 1 rotates by 180°. This TDC signal pulse is delivered to the ECU 5.

A three-way catalyst 14 is arranged in an exhaust pipe 13 of the engine 1 for scrubbing the toxic components HC, CO, and NOx in the exhaust gases. An oxygen concentration (O$_2$) sensor 15 is provided in the exhaust pipe 13 at a location upstream of the three-way catalyst 14 for sensing the concentration of oxygen in the exhaust gases and for supplying the ECU 5 with a signal indicative of the value of the oxygen concentration sensed thereby.

Further connected to the ECU 5 are an atmospheric pressure (PA) sensor 16 for detecting atmospheric pressure and an starting switch 17 for actuating an engine starter for starting the engine, these supplying the ECU 5 with electrical signals indicative of detected atmospheric pressure and of the on/off status of the switch, respectively.

An exhaust return passageway 18 is provided between the exhaust pipe 13 and the intake pipe 13 to connect them together. An exhaust return valve 19 is arranged in the exhaust return passageway 18. The exhaust return valve 19 is a negative-pressure responsive valve and is mainly comprised of a valve body 19a arranged to open and close the passageway 18, a diaphragm 19b connected to the valve body 19a actuated by atmospheric pressure or negative pressure selectively introduced by electromagnetic control valves 21, 22, described below, and a spring 19c urging the diaphragm 19b in a direction closing the valve. A negative pressure chamber 19d is defined inside the valve 19 by the diaphragm 19b and has a passageway 20 connected thereto. The electromagnetic control valve 22 (hereinafter referred to as "SOL. B"), which is of the normally closed type, is arranged across the passageway 20. The arrangement is such that absolute pressure inside the intake pipe 2 is introduced to the negative pressure chamber 19d via SOL. B. 22. A passageway 23 communicating with the atmosphere is connected to the passageway 20 downstream of the SOL. B 22. The electromagnetic control valve 21 (hereinafter referred to as "SOL. A"), which is of the normally open type, is arranged across the passageway 23. The arrangement is such that atmospheric pressure is introduced to the passageway 20 via SOL. A 21 and thence to the negative pressure chamber 19d. SOL. A 21 and SOL. B 22 are connected to the ECU 5 and operate together or singly in response to signals from the ECU 5 to control the lifting operation and lifting velocity of the valve body 19a of the exhaust return valve 19.

The exhaust return valve 19 is provided with a valve lift sensor 24 for sensing the operating position of the valve body 19a of the valve 19 and supplying the ECU 5 with an output signal indicative of the value sensed.

On the basis of the engine parameter signals from the various sensors mentioned above, the ECU 5 determines operating conditions in which the engine is operating and calculates the period of time during which the fuel injection valve 6 is to be opened, namely a fuel injection period TOUTM, at engine start in accordance with the following equation:

$$TOUTM = TiCRM \times KNe + Tv \tag{1}$$

In Equation (1), TiCRM is a basic value of the valve opening period of each fuel injection valve 6 and is determined by a TiCRM table. KNe represents a correction coefficient applied at engine start and determined as a function of engine rotational speed Ne by a KNe table. Tv is a variable for increasing or decreasing the valve opening period in dependence upon a change in battery voltage and is obtained from a Tv table.

The ECU 5 calculates the fuel injection period TOUTM of the fuel injection valve 6 in accordance with the following equation when the engine is operating, namely at times other than engine start:

$$TOUTM = TiM \times (KTA \cdot KTW \cdot KAFC \cdot KPA \cdot \tag{2}$$

$$KAST \cdot KWOT \cdot KO_2 \cdot KLS) + TACC \times$$

$$(KTA \cdot KTWT \cdot KAFC \cdot KPA \cdot KAST) + Tv$$

In Equation (2), TiM is a basic value of the valve opening period of each fuel injection valve 6 and calculated from a TiM map and $\Delta$TiM map by a method described below. TACC represents a fuel-increasing variable applied at acceleration and is determined by an acceleration subroutine. Coefficients KTA, KTW ... are calculated in accordance with respective tables and subroutines. KTA, KTW are fuel-increasing coefficients obtained in dependence upon intake air temperature TA and actual engine coolant temperature TW, respectively. KAFC is a fuel-increasing coefficient applied immediately after fuel has been cut off. KPA is an atmospheric pressure-dependent correction coefficient obtained in dependence upon actual atmospheric pressure. KAST represents a fuel-increasing coefficient applied immediately after engine start. KWOT is a constant and represents a mixture-enriching coefficient applied when the throttle is fully open. $KO_2$ is an $O_2$ feedback correction coefficient obtained in dependence upon the actual oxygen concentration in the exhaust gases. KLS is a constant and represents a mixture-leaning coefficient. TACC is a fuel-increasing variable applied at acceleration.

The CPU 5 supplies each fuel injection valve 6 with a driving signal which opens the valve 6 over the fuel injection period TOUTM obtained as set forth above.

The ECU 5 supplies on/off signals to SOL A 21 and SOL B 22 in dependence upon a deviation between a lift command value LMAP of the exhaust return valve 19, which value is set in accordance with the absolute pressure PBA inside the intake pipe and the rotational speed Ne of the engine, and a value LACT indicative of the actual opening of the exhaust return valve 19 sensed by the valve lift sensor 24, so that the deviation will become zero.

FIG. 2 illustrates the internal construction of the ECU 5 shown in FIG. 1. Each TDC signal pulse obtained from the Ne sensor 11 has its waveform shaped by a waveform shaping circuit 501 and it is applied to a central processing unit (hereinafter referred to as the "CPU") 503 wherein it is applied as an interrupt signal for starting execution of a control program shown in the flowchart of FIG. 3. The shaped Ne signal is also supplied to an Me counter 502. The latter counts the time interval between successive TDC signal pulses inputted from the Ne sensor 11, and the value Me of the count recorded thereby is proportional to the reciprocal of the rotational speed Ne of the engine. The Me counter 502 applies the counted value Me to the CPU 503 via a data bus 510.

Output signals from $\theta$TH sensor 4, PBA sensor 8, TW sensor 10, PA sensor 16 and valve lift sensor 24 are shifted to a predetermined voltage level by a level shifter unit 504 before being successively inputted to an A/D converter 506 by a multiplexer 505. The A/D converter 506 successively converts the level-shifted analog output voltages from the aforementioned sensors 4, 8, 11 into digital signals which are then fed into the CPU 503 via the data bus 510.

A signal indicating whether the starting switch 17 is in the on or off state is shifted to a predetermined voltage level by a lever shifter unit 513 and is then converted into a predetermined signal by a data input unit 514. This signal is applied to the CPU 503 via the data bus 510.

The CPU 503 is connected to a read-only memory (ROM) 507, a random-access memory (RAM) 508 and driving circuits 509, 512 via the data bus 510. The RAM 508 temporarily stores the results of calculations performed by the CPU 503. The ROM 507 stores the aforementioned TiM map and $\Delta$TiM map, as well as a control program, described below, executed by the CPU 503 to control fuel injection and exhaust gas recirculation.

In accordance with the control program, and as will be described in further detail below, the CPU 503 determines operating conditions of the engine 1 in dependence upon the output signals from the aforementioned engine operating parameter sensors, and provides the driving circuit 512 with the on/off control signal to control the on/off action of SOL. A 21 and SOL. B 22, thereby controlling the amount of exhaust gases to be recirculated. The CPU 503 also calculates the valve opening period for the fuel injection valves 6 on the basis of the operating conditions of the engine and outputs a signal indicative of the valve opening period to the driving circuit 509 via the data bus 510. In response, the driving circuit 509 supplies each fuel injection valve 6 with a control signal that opens the valve 6 for a period of time conforming to the calculated value. The driving circuit 512 supplies SOL. A 21 and SOL. B 22 with on/off driving signals to turn these control valves on or off.

The fuel supply control method of the invention applied to the system constructed as set forth above will now be described in detail.

FIG. 3 shows the control program executed in the ECU 5 to control the valve opening period and exhaust gas recirculation in synchronization with TDC signal pulses. Overall, the control program is composed of an input signal-processing block I, a basic control block II, and an engine start control block III. First, in the input signal-processing block I, a step 301 calls for the CPU in the ECU 5 to be initialized when the ignition switch of the engine 1 is closed. In response to engine start, TDC signal pulses enter the ECU 5 at a step 302. This is followed by a step 303, at which the engine operating parameter signals from the various sensors, which signals are all basic analog values, as well as a signal indicative of the on or off state of the starting switch 17, are read in the ECU 5 and the necessary values are stored in the RAM 508. Next, at a step 304, elapsed time from the immediately preceding TDC signal pulse until the current TDC signal pulse is counted, the rotational speed Ne of the engine is calculated based on the value of the value of the count, and Ne is stored in the RAM 508.

The control program then proceeds to the basic control block II, in which it is determined at a step 305 whether the rotational speed Ne of the engine is less than a cranking speed (the rotational speed prevailing at engine start). It the answer received at this step is YES, then the program proceeds to a control subroutine for engine start in the control block III. In the control block III, a step 306 calls for TiCRM to be determined based on the engine coolant temperature TW retrieved from the TiCRM table. This is followed by a step 307, at which the correction coefficient KNe for engine start is determined by the KNe table, a step 308, at which the battery voltage correction variable Tv is determined by the Tv table, and a step 309, at which TOUTM at engine start is calculated by applying the numerical values obtained at the steps 306 through 308 to Equation (1).

During execution of the above-mentioned subroutine of block III, the lift command value LMAP of the lift command value map for setting the amount of lift of the valve body 19a of the exhaust return valve 19 is set to and held at zero at a step 310.

If a NO answer is received at the step 305, then it is determined at a step 311 whether fuel cut-off is to be carried out. If the answer is YES, then the aforementioned LMAP value is made zero at a step 312, and the value of TOUTM is made zero at a step 313.

If a NO answer is received at the step 311, on the other hand, then the correction coefficients KTA, KTW, KAFC, KPA, KWOT, KAST, $KO_2$, KLS, KTWT and the correction variables TACC, TV are calculated by respective subroutines or retrieved from respective tables at a step 314.

Next, a step 315 calls for a determination as to whether the actual engine coolant temperature TW is higher than a predetermined value TWE above which the exhaust gas recirculating operation can be effected.

If the answer at this step is NO, then the lift command value LMAP is set to zero at a step 316, whereby the exhaust return valve 19 is rendered inoperative to inhibit recirculation of the exhaust gases. This makes it possible to prevent a deterioration in driveability that might otherwise be caused by a decline in the stability of combustion within cylinders of the engine 1.

The program then proceeds to a step 317, at which a basic value TiM of the valve opening period of ignition valve 6 is selected, in dependence upon the actual engine rotational speed Ne and absolute pressure PBA inside the intake pipe, from the TiM map. The selected basic value TiM is applied when the exhaust return valve 19 is inoperative, which state shall hereinafter be referred to as the "EGR inoperative state".

FIG. 4 illustrates a map of the basic values TiM for the fuel injection valve 6. 17 predetermined values of absolute pressure PBA inside the intake pipe are provided as PBA1 through PBA17 covering a range of pressures of from 91 to 779 mmHg, by way of example. 18 predtermined values of engine rotational speed Ne are provided as N1 through N18 covering a range of rotational speeds of from 0 to 4000 rpm, also by way of example. Basic values TiM not on the cross points of the map are found by interpolation.

If a YES answer is received at the step 315, namely if the inequality TW>TWE holds, then the program proceeds to a step 318, at which the lift command value LMAP conforming to the actual engine rotational speed Ne and absolute pressure PBA inside the intake pipe is read out of the lift command value map. This lift command value LMAP is compared with the actual amount of lift LACT of the valve body 19a of the exhaust return valve 19 in FIG. 1. The operation for correcting the lift of the exhaust return valve 19 is controlled by actuating SOL. A 21 and SOL. B 22 (FIG. 1) together or singly so as to make zero the deviation between the two compared values. Thus, control is exercised in such a manner that a desired valve opening is obtained.

Next, it is determined at a step 319 whether the exhaust return valve 19 is operating, which state shall hereinafter be referred to as the "EGR operative state". If the answer received is NO, meaning that the EGR inoperative state is in effect, the step 317 is executed to select the basic value TiM from the TiM map.

If a YES answer is received at the step 319, meaning that the EGR operative state is in effect, the program proceeds to a step 320, at which an operation exactly the same as that of the step 317 is executed to select the basic value TiM. This is followed by a step 321, at which the correction value ΔTiM for the EGR operative state is read out of the ΔTiM map in dependence upon the engine rotational speed Ne and the absolute pressure PBA inside the intake pipe. The cross points of the engine rotational speed Ne and absolute pressure PBA in this ΔTiM map are set to be identical with those of the TiM map described above.

In the ΔTiM map, ΔTiM is set to a value which satisfies the following equation at each cross point with respect to TiM in the TiM map, where the basic value to be set for the EGR operative state is expressed by TiMEGR:

$$\Delta TiM = TiM - TiMEGR \qquad (3)$$

Next, the program proceeds from the step 321 to a step 322, where a value obtained by subtracting the correction value ΔTiM read out at the step 321 from the basic value TiM read out at the step 320 is set as the basic value TiM of the EGR operative state. Equation (3) shows that the basic value TiM set at the step 322 is equal to the basic value TiMEGR to be set for the EGR operative state. Since the correction value ΔTiM is very small in comparison with the basic value TiM, it is possible to reduce the capacity of the ROM 507 that is necessary for storing the correction values ΔTiM at the cross points of the ΔTiM map. For example, if the capacity of the ROM 507 at each of the cross points necessary for storing the basic values TiM is 16 bits, then a sufficient capacity necessary for storing the correction values ΔTiM will be eight bits. With the conventional control method, on the other hand, the basic values TiMEGR for the EGR operative state are mapped separately of the basic values TiM for the EGR inoperative state, as mentioned above, so that the required capacity of the ROM 507 at each cross point would be 16 bits in order to store TiMEGR. In other words, in accordance with the illustrated embodiment of the invention, the capacity of ROM 507 necessary for setting the basic values TiMEGR for the EGR operative state can be reduced by half in comparison with the prior art. That is, the basic values TiMEGR for the EGR operative state, which values are exactly the same as those in the prior art, can be set merely by providing the control program with the very simple additional processing steps 321, which is for reading out the correction value ΔTiM, and 322, which is for subtracting the correction value ΔTiM from the basic value TiM.

The program proceeds from the step 322 to a step 323, at which TOUTM is calculated in accordance with Equation (2) based on the correction coefficients, correction variables and the basic value selected as described above. This is followed by a step 324, at which the fuel injection valves 6 are operated based on the value of TOUTM obtained at the step 309, the step 313 or the step 323. Then, the main program is ended.

Although in the foregoing embodiment during the EGR operative state the basic value TiM for the EGR inoperative state is corrected by the correction value ΔTiM. This is not limitative to the invention, but it may be so arranged that basic values TiM' and correction values ΔTiM' therefor are stored in the ROM and during the EGR inoperative state the basic value TiM' is corrected by the correction ralue ΔTiM.

Further, the foregoing embodiment is for reducing the ROM capacity of a map used in order to control a basic fuel supply value in dependence upon whether EGR is operative or not. However, it is also possible to apply the method of the invention to control depending upon other factors so as to reduce the capacity of the ROM necessary for storing maps for the control depending on other factors, together with the control depending or whether EGR is operation or not, or singly.

By way of example, vehicles provided with an engine come equipped with either a manual transmission or an automatic transmission (the former vehicles, will hereinafter be referred to as "MT vehicles" and the latter as "AT vehicles"). In accordance with the conventional control method, maps of the basic values TiM for the fuel injection valves in the EGR operative state and maps of the lift command values LMAP for the valve body of the exhaust return valve are separately provided for MT vehicles and for AT vehicles in view of the fact that the amount of fuel required by the engine, the amount of NOx emitted, etc., differ between the two types of vehicles. However, according to the method of the invention it will suffice to provide one map of basic values TiM and one map of lift command values LMAP solely for MT vehicles and, in the case of AT vehicles, to multiply the values obtained from these maps by respective predetermined values in order to obtain the basic value TiM. The ratio of the required basic fuel supply values and the ratio of the required exhaust gas recirculation amounts between the AT and MT vehicles are substantially constant, irrespective of operating conditions of the engine. Therefore, by applying the method of the present invention, it is possible to set the basic values TiM and lift command values LMAP depending upon whether the vehicle is of the AT or MT type, with ROM capacity greatly reduced while appropriate fuel supply control similar to that of the prior art is secured.

FIG. 5 shows another embodiment of the invention wherein the basic value TiM and the lift command value LMAP are set in dependence upon whether the vehicle equipped with the engine is of the AT or MT type. The steps in FIG. 3 other than those illustrated in FIG. 5 can directly apply to the FIG. 5 embodiment. First, in a step 501 it is determined whether the vehicle on which the engine 1 is installed is of the MT type or not. If the answer is YES, that is, if the vehicle is of the MT type, the program proceeds to a step 502 wherein a value of the lift command value LMAP is read from the lift command value map, which conforms to the actual engine rotational speed Ne and the intake pipe absolute pressure PBA, followed by the program proceeding to a step 506, hereinafter referred to. On the other hand, if the answer at the step 501 indicates that the vehicle is of the AT type, the program proceeds to a step 503, at which an operation exactly the same as that of the step 502 is executed to read a value of the lift command value LMAP. This is followed by a step 504 at which a correction value MAP which is a fixed value is read out of the ROM 507. Then, at a step 505 the lift command value LMAP for the AT type vehicle is set to a value obtained by multiplying the lift command value LMAP read at the step 503 by the correction value LMAP read at the step 504.

After execution of the step 502 or 505, steps 506 through 510 are executed for setting the basic value TiM depending upon whether or not the EGR operative state holds in exactly the same manner as the aforedescribed steps 319-322 in FIG. 3, and therefore specific description of these steps 506-510 is omitted.

After execution of the steps 506-510, a step 511 calls for a determination as to whether or not the vehicle on which the engine 1 is installed is of the MT type. If the vehicle is of the MT type, the TOUT value is calculated in accordance with Equation (2) referred to before by using the TIM value obtained at the step 507 or the step 510, at a step 512. On the other hand, if the vehicle is of the AT type, a correction value $\Delta TIMAT$ which is a fixed value is read out of the ROM 507, at a step 513, followed by a step 514 wherein the basic value TIM for the AT vehicle is set to a value obtained by multiplying the TIM value obtained at the step 507 or the step 510 by the read correction value $\Delta TIMAT$ so that the TOUT value is calculated at the step 512 by using the TIM value set at the step 514.

The FIG. 5 embodiment described above is based upon the recognition that the ratio of required TIM values and the ratio of required LMAP values between the AT vehicle and the MT vehicle are substantially constant irrespective of operating conditions of the engine, and corrects the TIM value and the LMAP value read, respectively, from the TIM map and the LMAP map both provided for the MT vehicle, for example, through multiplication by the respective fixed correction values $\Delta TIMAT$ and $\Delta LMAP$. Therefore, according to this embodiment it is possible to further reduce the ROM capacity to a much smaller value as compared with that according to the prior art, as well as to simplify the control program while securing precise control.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling an operation of an internal combustion engine, comprising:
   (a) storing in memory means one set of a plurality of basic values of a control amount by which said operation of said engine is to be controlled, and which conform to at least one operating parameter of said engine;
   (b) storing in said memory means at least one correction value for correcting said basic values of said control amount, said correction value being for correcting the difference between a basic value of said control amount required when one of first and second conditions under which said operation of said engine is required to be controlled by respective different amounts is satisfied, and a basic value of said control amount required when the other of said first and second conditions is satisfied;
   (c) detecting said first and second conditions;
   (d) when each of said first and second conditions is detected in said step (c), reading from said memory means ones of said basic values of said control amount, which correspond to values of said at least one operating parameter of said engine;
   (e) when a predetermined one of said first and second conditions is detected in said step (c), reading from said memory means said at least one correction value, and correcting said basic values of said control amount read in said step (d) by said at least one correction value; and
   (f) controlling said operation of said engine by control amounts based upon said basic values of said control amount corrected in said step (e).

2. A method of controlling supply of fuel to an internal combustion engine, comprising:
   (a) storing in memory means one set of a plurality of basic fuel supply values which conform to at least one operating parameter of said engine;
   (b) storing in said memory means at least one correction value for correcting said basic fuel supply values, said correction value being for correcting the difference between a basic fuel supply value required when one of first and second conditions under which said engine requires respective different amounts of fuel is satisfied, and a basic fuel supply value of said control amount required when the other of said first and second conditions is satisfied;
   (c) detecting said first and second conditions;
   (d) when each of said first and second conditions is detected in said step (c), reading from said memory means ones of said basic fuel supply values, which correspond to values of said at least one operating parameter of said engine;

(e) when a predetermined one of said first and second conditions is detected in said step (c), reading from said memory means said at least one correction value, and correcting said basic fuel supply values read in said step (d) by said at least one correction value; and (f) supplying said engine with amounts of fuel based upon said basic fuel supply values corrected in said step (e).

3. A method as claimed in claim 2, wherein said engine is equipped with an exhaust gas recirculation control system, and one of said first and second conditions is fulfilled when said exhaust gas recirculation control system is operative, and the other one of said first and second conditions is fulfilled when said exhaust gas recirculation control system is inoperative.

4. A method as claimed in claim 3, wherein said at least one correction value comprises a plurality of correction values conforming to said at least one operating parameter of said engine, said step (f) comprising reading ones of said correction values which conform to values of said at least one operating paramter of said engine, and correcting said basic fuel supply values read in said step (d) by said correction values thus corrected.

5. A method as claimed in claim 4, wherein in said step (f) said at least one correction value is subtracted from said basic fuel supply values read in said step (d).

6. A method as claimed in claim 2, wherein one of said first and second conditions is fulfilled when said engine is installed in a vehicle equipped with a manual transmission, and the other of said first and second conditions is fulfilled when said engine is installed in a vehicle equipped with an automatic transmission.

7. A method as claimed in claim 6, wherein said at least one correction value comprising a single fixed value by which said basic fuel supply values read in said step (d) are multiplied.

* * * * *